United States Patent [19]

Schmid

[11] Patent Number: 4,878,630
[45] Date of Patent: Nov. 7, 1989

[54] GUIDE ROLLER ASSEMBLY

[75] Inventor: Reinhold Schmid, Monchen-Gladbach, Fed. Rep. of Germany

[73] Assignee: W. Schlafhorst & Co., Fed. Rep. of Germany

[21] Appl. No.: 316,228

[22] Filed: Feb. 27, 1989

[30] Foreign Application Priority Data

Mar. 2, 1988 [DE] Fed. Rep. of Germany ....... 3806691

[51] Int. Cl.$^4$ .................... B65H 54/28; B65H 54/20; F16C 13/02; F16C 33/76
[52] U.S. Cl. ............................ 242/43 R; 242/35.5 R; 242/158 R; 384/58; 384/488; 384/547
[58] Field of Search ............... 242/43 R, 43.1, 35.5 R, 242/158 R, 158.1, 158.3, 158.5; 384/50, 58, 488, 547

[56] References Cited

U.S. PATENT DOCUMENTS

| | | | |
|---|---|---|---|
| 1,856,547 | 5/1932 | Gotthardt | 384/488 |
| 2,904,938 | 9/1959 | Bassoff | 384/547 X |
| 2,928,701 | 3/1960 | Ferdig | 384/547 |
| 4,145,093 | 3/1979 | Sekerich | 384/547 X |
| 4,458,957 | 7/1984 | Greener | |
| 4,580,737 | 4/1986 | Schmid | 242/43 R X |
| 4,602,875 | 7/1986 | Doerr et al. | 384/547 |

FOREIGN PATENT DOCUMENTS 1957119  1/1971  Fed. Rep. of Germany.
3345743  6/1985  Fed. Rep. of Germany.

*Primary Examiner*—Stanley N. Gilreath
*Attorney, Agent, or Firm*—Shefte, Pinckney & Sawyer

[57] ABSTRACT

In a guide roller assembly such as utilized for supporting a reciprocating yarn guide rod in a textile winding machine, the guide roller assembly having an outer shell rotatably supported on a carrier member by an interposed ball bearing assembly, problems of internal contamination of the guide roller assembly are avoided by provision of a plurality of annular projecting walls on one or both of the outer shell and the carrier member to define narrow annular spacings between the outer shell and the carrier member at the annular walls and annular air chambers in radial series between the walls. The narrow annular spacings are preferably of a maximum dimension in the range of a few tenths of a millimeter. Debris entering the interior of the guide roller assembly tends to be propelled radially outwardly and accumulates at the annular spacings to resist entry of further debris.

6 Claims, 2 Drawing Sheets

GUIDE ROLLER ASSEMBLY

BACKGROUND OF THE INVENTION

The present invention relates generally to a guide roller assembly and, more particularly, to a guide roller assembly adapted for supporting a reciprocating yarn guide rod in a textile bobbin winding machine.

In one conventional type of textile bobbin winding machine, a yarn guide is mounted to a support rod which is longitudinally reciprocated alongside a rotating bobbin for traversing delivery of a traveling yarn to the bobbin for cross-wnding thereabout. Typically, the reciprocating yarn guide rod is supported by a system of plural guide roller assemblies, each of which basically includes an outer shell rotatably supported on a fixed carrier by a ball bearing assembly or the like interposed therebetween. Guide roller assemblies of this basic type have a tendency to wind yarns and fibers thereabout and to allow yarn pieces and fibers to enter the ball bearing assembly, which impairs the ability of the guide roller assembly for free rotation and ultimately causes the guide roller assembly to fail.

SUMMARY OF THE INVENTION

It is accordingly an object of the present invention to provide an improved guide roller assembly of the aforementioned type having an increased operating life.

Basically, the guide roller assembly of the present invention includes an outer shell having an annular rim portion configured for rotational supporting engagement with the reciprocating yarn guide rod of a bobbin winding machine, a central shaft portion, and a continuous wall portion extending between the rim and shaft portions; a fixed carrier member; and a lubricated ball bearing assembly interposed between the carrier member and the outer shell for rotatably supporting the outer shell. According to the present invention, at least one of the outer shell and the carrier member have a plurality of annular projecting portions defining a plurality of relatively narrow annular spacings between the outer shell and the carrier member and further defining a plurality of annular air chambers arranged radially in series between the projecting portions in communication with one another through the spacings. A radially inwardmost one of the air chambers is located in the vicinity of the central shaft portion of the outer shell and a radially outwardmost one of the air chambers is located in the vicinity of the rim portion of the outer shell. Preferably, the componentry of the guide roller assembly is closely dimensioned so that the annular spacings have a maximum dimension in the range of a few tenths of a millimeter.

In this manner, the ball bearing assembly can be effectively protected against contamination by dust, fibers and the like. Specifically, the ball bearing assembly will normally be packed with grease or another suitable lubricant intended in conventional fashion to lubricate the moving components with respect to one another and to cover them against the ambient atmosphere. The radially inwardmost air chamber communicates with one side of the ball bearing assembly whereat lubricating grease packed into the ball bearing assembly accumulates in a bead or roll forming a seal between the ball bearing assembly and the air chamber. While the radially inwardmost air chamber communicates via one annular spacing with a next radially outward annular chamber, dust particles and other debris do not tend to enter the inwardmost air chamber because rotation of the outer shell causes any dust particles entering the outward air chamber to be accelerated radially outwardly to move away from the inward air chamber. Preferably, a third radially outwardmost air chamber is provided and communicates with the second-mentioned air chamber via another annular spacing to perform in the same manner to resist entry of dust and debris into the intermediate air chamber to further resist entry of dust and debris into the ball bearing assembly. Thus, any dust or debris which enters the guide roller assembly tends to remain within or migrate into the radially outwardmost air chamber from which the dust and debris may be expelled from the guide roller assembly during its rotational operation.

The annular spacings formed by the annular projecting portions are dimensioned sufficiently narrowly, as aforementioned, so that any fiber particles which enter the guide roller assembly tend to form in fiber rings at the annular slots, this result being facilitated by the reciprocatory rotation of the guide roller assembly with the reciprocating movement of the yarn guide rod. However, this result is not disadvantageous in that, once such a fibrous ring has formed at an annular spacing, the fibrous ring thereafter serves to prevent any further fibrous particles from passing through the annular spacing into the next radially inward air chamber.

According to another feature of the present invention, one of the annular projecting portions extends from the continuous wall portion of the outer shell concentrically with respect to the rotational axis of the outer shell into close proximity to the outer race ring of the ball bearing assembly at a spacing thereto of only a few tenths of a millimeter, as aforementioned. Advantageously, it is possible to establish the dimension of this annular spacing with relative exactness by polishing or otherwise forming the outer race ring of the ball bearing assembly precisely to an exact desired dimension. Preferably, the rim portion of the outer shell is formed with an interior wall surface which extends radially outwardly from the continuous wall portion to a terminal rim edge. In this manner, dust and debris particles tend to slide along the interior wall surface of the rim portion at an increasing rate as the rotational speed of the guide roller assembly increases, serving either to expel the dust and debris particles from the guide roller assembly at an annular spacing at the terminal rim edge or to accumulate the debris thereat to form a sealing ring.

It is also preferred that the continuous wall portion of the outer shell include a plurality of radially oriented wings extending into one of the air chambers. As the outer shell of the guide roller assembly is rotated, such wings cause a constant movement of any dirt and debris particles within the air chamber to assist in radially outward centrifugal movement of the particles.

In order to prevent contamination of the ball bearing assembly at its opposite side away from the radially inwardmost air chamber, the bearing carrier is provided with a central bore which communicates with the ball bearing assembly to form a storage chamber for lubricant to be supplied to the ball bearing assembly. A closure is fitted to the carrier member for sealing the bore from ambient communication.

The closure is adapted to be manually pressed into the central bore to act as a plunger to force stored lubricant from the chamber into the ball bearing assembly and even therebeyond into the radially inwardmost air chamber, as previously mentioned.

In order to permit periodic inspections and cleaning of the guide roller assembly in a simple manner, the closure is provided with a release pin extending into the storage chamber toward the shaft portion of the outer shell so that, by manually pressing the closure with a sufficient force, the release pin engages the central shaft portion of the outer shell to detach the outer shell from the ball bearing assembly while at the same time emptying lubricant from the storage chamber. With the outer shell thusly removed, the interior surfaces of the guide roller assembly may be easily cleaned and inspected, after which the lubricant storage chamber may be replenished with lubricant and the outer shell then remounted onto the ball bearing ssembly.

DESCRIPTION OF THE PREFERRED EMBODIMENT

Figure 1:
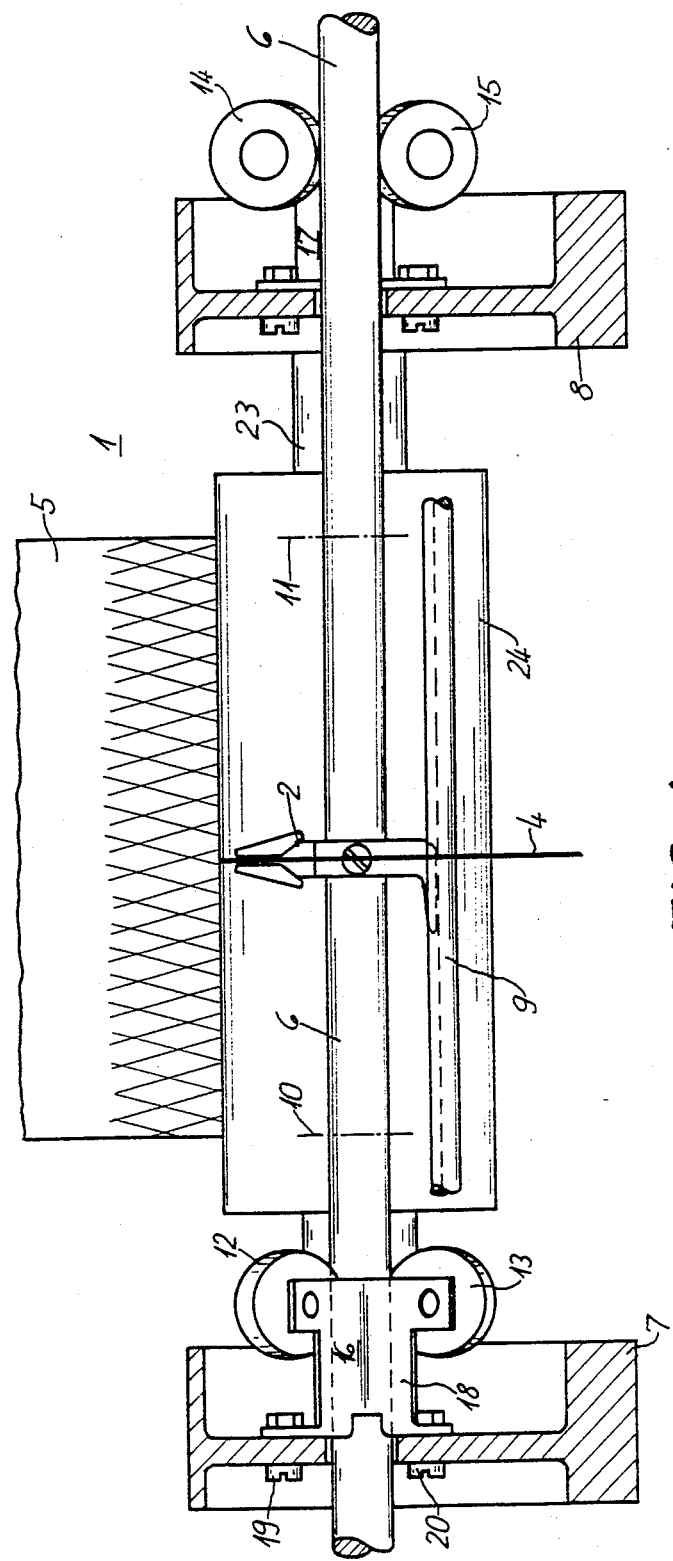
FIG. 1 is a view, partially in elevation and partially in cross-section, showing a plurality of guide roller assemblies according to the present invention as preferably embodied for collectively supporting a reciprocating yarn guide rod in a textile winding machine.

Referring now to the accompanying drawings, FIG. 1 illustrates a textile winding machine, indicated generally at 1, of the basic type wherein a traveling yarn 4 is trained through a yarn guide 2 affixed to a supporting rod 6 mounted to frame members 7,8 of the winding machine 1 for longitudinal reciprocation in parallel relation to a bobbin 5 rotatably supported by the machine frame. In operation, the bobbin 5 is rotated by peripheral surface contact with a winding roller 24 driven by a shaft 23 while simultaneously the yarn guide rod 6 is longitudinally reciprocated to traverse the yarn guide 2 back and forth along the bobbin 5 to apply the traveling yarn 4 to the bobbin 5 in successive crossing layers to build the bobbin 5 in a typical cross-wound fashion. The winding machine 1 may include a plurality of like winding stations arranged side-by-side with a separate yarn guide 2 provided on the reciprocating guide rod 6 for each winding station.

As shown in FIG. 1, one end of the yarn guide 2 is retained in a grooved guide rail 9 to prevent undesired movement of the guide 2 forwardly or rearwardly with respect to the bobbin 5. The leftward and rightward extents of the traversing travel of the yarn guide 2 are respectively indicated at 10 and 11, as determined by the extent of the reciprocating traverse of the yarn guide rod 6.

The yarn guide rod 6 is guided and supported in its reciprocal path of travel by a plurality of relatively small guide roller assemblies, indicated generally in FIG. 1 at 12,13,14,15. The guide roller assemblies are preferably mounted in pairs, as represented by the guide roller pair 16 of the guide roller assemblies 12,13 and the guide roller pair 17 of the guide roller assemblies 14,15, which facilitates the rotational engagement of the guide roler assemblies with the outer periphery of the yarn guide rod 6. Each guide roller assembly of a guide roller pair is mounted to a common base support plate, as represented by the plate 18 supporting the guide roller assemblies 12,13 of the guide roller pair 16. The base support plate for a guide roller pair is mounted, in turn, to the machine frame, e.g., by appropriate mounting screws, as represented at 19,20. Further, it is desirable to mount separate roller pairs to engage opposite sides of the yarn guide rod 6. For example, in FIG. 1, the guide roler assemblies 12,13 of the roller pair 16 are mounted for engagement of the forwardly facing surfaces of the yarn guide rod 6 while the guide roller assemblies 14,15 of the guide roller pair 17 are mounted to engage the opposite rearwardly facing surfaces of the yarn guide rod 6. As necessary or desirable, additional guide roller pairs may be provided in supporting engagement with the yarn guide rod 6 at other relative dispositions thereabout. In this manner, the yarn guide rod 6 is easily aligned and constrained to travel in a substantially linear path of reciprocation.

Figure 2:
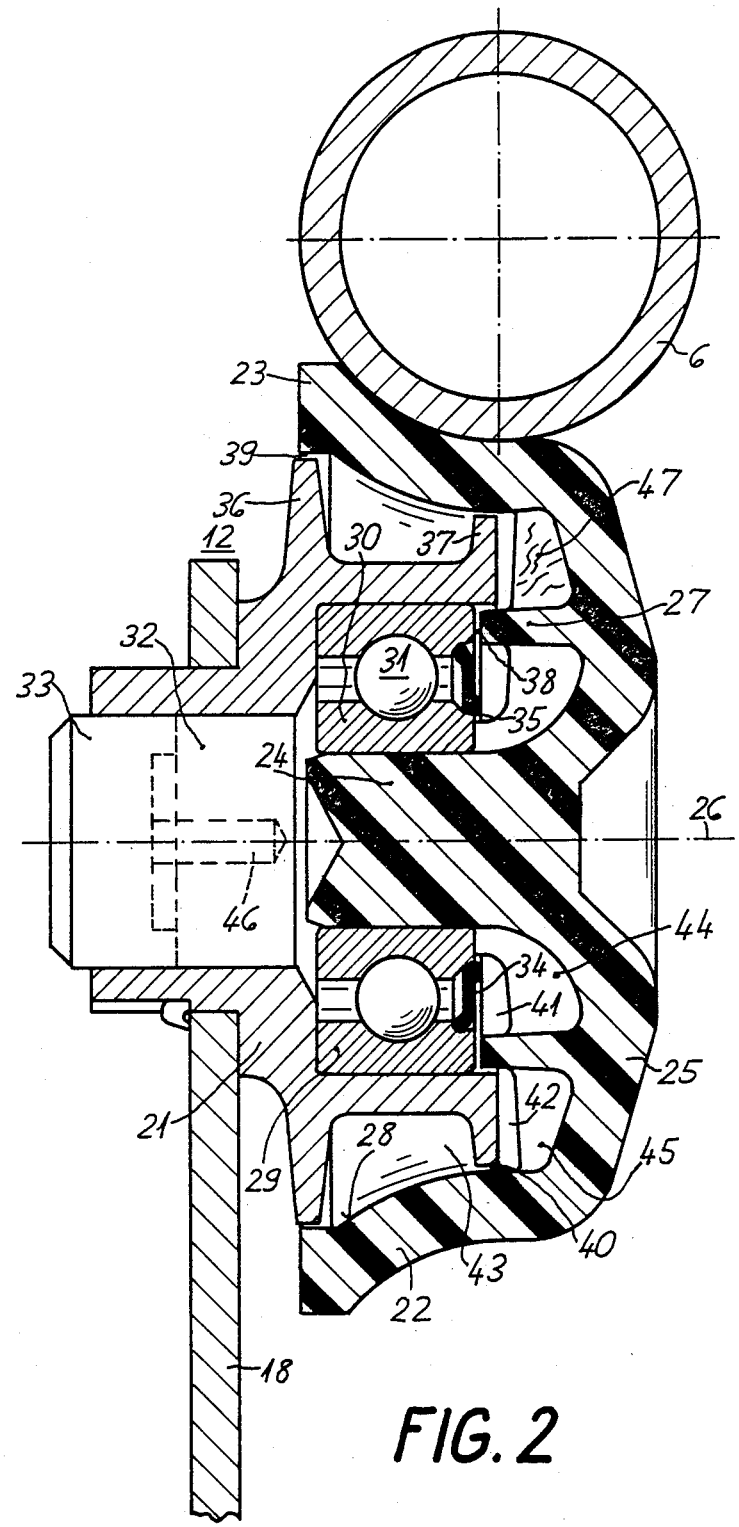
FIG. 2 is an enlarged cross-sectional view taken diametrically through the yarn guide rod and one guide roller assembly of FIG. 1.

While the guide roller assemblies 12,13,14,15 are shown only schematically in FIG. 1, FIG. 2 illustrates the guide roller assembly 12 and the yarn guide rod 6 in a substantially enlarged cross-sectional view taken diametrically through each. As shown, the yarn guide rod 6 is of a tubular construction having a circular cross-section. The guide roller assembly, indicated in its entirety at 12, basically includes a bearing carrier member 21 fixedly mounted to the supporting base plate 18, an outer shell generally indicated at 50, and a ball bearing assembly 31 interposed between the bearing carrier member 21 and the outer shell 50 for rotatably supporting the outer shell 50. The outer shell 50 includes a central shaft portion 24 from which extends an integral continuous radial wall portion 25 which merges into an integral annular rim portion 22 terminating in an annular flange 23. The exterior surface of the rim portion 22 is configured to conform to the circular outer periphery of the yarn guide rod 6 for rotational engagement therewith. An annular wall 27 projects interiorly from the radial wall portion 25 concentrically with respect to the central rotational axis 26 of the outer shell 50 as defined by the shaft potion 24. The interior wall surface 28 of the rim portion 22 is configured to extend radially outwardly with respect to the rotational axis 26 from the interior surface of the radial wall portion 25 to the terminal interior edge of the flange 23.

The ball bearing assembly 31 basically includes an outer race ring 29 and an inner race ring 30 between which a plurality of spherical bearing balls are disposed to support the inner and outer rings 29,30 rotatably with respect to one another. The central shaft portion 24 of the outer shell 50 is press-fitted into the inner ball race ring 30 of the ball bearing assembly 31, while the outer ball race ring 29 of the ball bearing assembly 31 is similarly press-fitted into the bearing carrier member 21. Accordingly, the outer ball race ring 29 is essentially held fixed by the fixed bearing carrier member 21 while the inner ball race ring 30 and the outer shell 50 are relatively rotatably as a unit with respect to the outer race ring 29 and the bearing carrier member 21.

The bearing carrier member 21 is formed with a central bore 32 in communication with the bal bearing assembly 31 for service as a storage chamber of grease or another suitable lubricant for the ball bearing assembly 31. A plunger member 33 or another suitable closure member is fitted within the bore 32 to sealably enclose the lubricating chamber while also permitting sliding movement of the plunger member 33 within the bore 32 for selectively injecting the lubricant into the ball bearing assembly 31 and to form a bead or coating 35 of the lubricant on th interior surface of a seal 34 which covers the opposite forward side of the ball bearing assembly 31.

The bearing carrier member 21 also includes two radially-projecting annular wall portions 36,37, the projecting wall 36 extending into close proximity with the termial flange 23 of the rim portion 22 of the outer shell 50 and the projecting wall 37 extending into close proximity with the interior wall surface 28 of the rim portion 22.

The annular interiorly-projecting wall 27 of the outer shell 50 extends into close proximity with the outer ball race ring 29 of the ball bearing assembly 31 to define a narrow annular spacing 38 therebetween of a dimension preferably in the range of approximately one-tenth (0.1) of a millimeter. Likewise, the projecting wall 27 is positioned radially with respect to the adjacent surface of the bearing carrier member 21 within which the outer ball race ring 29 is fitted to be spaced therefrom a corresponding dimension, whereby the spacing between the projecting wall 27 and the outer race ring 29 and the carrier member 21, respectively forms an annular slot of an angular or generally L-shaped configuration. The projecting wall 36 of the carrier member 21 similarly defines a narrow spacing 39 with the flange 23 of the outer shell 50 of a like dimension in the range of about one-tenth of a millimeter, and the projecting wall 37 likewise terminates at a spacing 40 from the rim portion 22 of essentially the same dimension.

The respective projecting walls 27,36,37 divide the interior area of the guide roller assembly 12 between the outer shell 50 and the carrier member 21 into three annular air chambers 41,42,43 essentially arranged radially in series and communicating with one another through the annular spacings 38,39,40. The radially inwardmost air chamber 41 is thus located in the vicinity of the central shaft portion 24 of the outer shell 50 at the forward side of the ball bearing assembly 31. The next radially outward air chamber 42 is defined between the rim portion 22 and the projecting wall 27. The air chamber 43 is located radially outwardmost between the interior wall surface 28 of the rim portion 22 and the bearing carrier 21.

The radial wall portion 25 of the outer shell 50 of the guide roller assembly 12 is formed on its interior surface with four circumferentially-spaced, radially-extending wings 44 which extend into the radially inwardmost air chamber 41. In the same manner, four circumferentially-spaced, radially extending wings 45 extend from the interior surface of the radial wall portion 25 into the radially intermediate air chamber 42.

The plunger member 33 preferably includes a release pin 46 projecting from the interior side of the plunger member 33 toward the central shaft portion 24 of the outer shell 50. The release pin 46 is thereby disposed for movement into engagement with the axial inward face of the shaft portion 24 to permit the outer shell 50 to be detached from the ball bearing assembly 31 manually by the exertion of a sufficient pressing force against the plunger member 33. The ball bearing assembly 31 preferably is a deep groove-type ball bearing assembly.

The outer shell 50 of the guide roller assembly 12 is preferably manufactured by injection molding from a thermoplastic or other suitable material to provide the outer shell 50 with a relatively low mass. Further, such plastic materials provide sufficient long-term dimensional stability to the outer shell 50 to maintain the desired narrowness of the annular spacings 38,39,40 within the desired range of about one-tenth of a millimeter. As will be understood, the outer shell 50 may be fabricated of other suitable materials which provide even better long-term dimensional stability to enable the annular spacings 38,39,40 to be selected to be even narrower.

In the operation of the present invention, the entry of fiber fragments, dust, and other airborne debris into the radially outwardmost air chamber 43 ned not be avoided. The radially outwardly oriented interior wall surface 28 of the rim portion 22 serves to continuously direct any such debris particles entering the air chamber 43 radially outwardly in the direction of the annular spacing 39 so that an annular accumulation of fiber ultimately forms at the spacing 30 to resist further entry of debris. To the extent any debris particles enter into the intermediate air chamber 42 via the annular spacing 40, such as represented by the particles 47 in FIG. 2, such debris is maintained in motion within the chamber 42 by the wings 45 and, therefore, the annular spacing 40 remains largely free of debris due to the air vortices created. The annular spacing 38 likewise remains largely dust-free as a result of the air vortices created by the wings 44 within the air chamber 41. To the extent any debris particles enter the air chamber 41, such particles may partially bind to the lubricant bead 35. As a net result, the present apparatus resists entry of dirt particles, fiber fragments, yarn fragments, and other debris into the interior area between the outer shell 50 and the bearing carrier 21 and thereby prevents the roller assembly of the invention from becoming contaminated to the point of failure so that a substantially trouble-free long-term operation of the roller assembly is assured.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. For example, it is contemplated that the projecting walls 27, 36, 37 might all be formed as part of the outer shell 50 or as part of the carrier member 21 or, alternatively any other arrangement of projecting walls formed as part of either or both the outer shell 50 and the carrier member 21 might be utlized. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. In a textile bobbin winding machine of the type having a reciprocating yarn guide rod for crosswinding yarn bobbins, a guide roller assembly for supporting said yarn guide rod, said guide roller assembly comprising:

an outer shell having an annular rim portion configured for rotational supporting engagement with said yarn guide rod, a central shaft portion, and a continuous wall portion extending between said rim and shaft portions;

a fixed carrier member; and a lubricated ball bearing assembly interposed between said carrier member and said outer shell for rotatably supporting said outer shell;

at least one of said outer shell and said carrier member having a plurality of annular projecting portions defining a plurality of relatively narrow annular spacings between said outer shell and said carrier member and further defining a plurality of annular air chambers in series between said projecting portions in communication with one another through said spacings, a radially inwardmost one of said air chambers being located in the vicinity of said central shaft portion of said outer shell and a radially outwardmost one of said air chambers being located in the vicinity of said rim portion of said outer shell.

2. A guide roller assembly according to claim 1 and characterized further n that said ball bearing assembly includes an inner ball race ring and an outer ball race ring supported rotatably with respect to one another, and one said annular projecting portion extends from said continuous wall portion of said outer shell concentrically to the axis of rotation of said outer shell into close proximity to said outer race ring of said ball bearing assembly.

3. A guide roller assembly according to claim 1 and characterized further in that said rim portion includes an interior wall surface which extends radially outwardly from said continuous wall portion to a terminal rim edge.

4. A guide roller assembly according to claim 1 and characterized further n that said continuous wall portion of said outer shell includes a plurality of radially oriented wings extending into one said air chamber.

5. A guide roller assembly according to claim 1 and characterized further in that said carrier member is formed with a central bore communicating with said ball bearing assembly for storing a quantity of lubricant for supply to said ball bearing assembly, and said carrier member includes a closure for sealing said bore from ambient communication.

6. A guide roller assembly according to claim 5 and characterized further in that said closure comprises a release pin projecting into said bore, said closure being selectively movable within said bore for contacting said central shaft portion of said outer shell by said release pin to detach said outer shell from said ball bearing assembly to permit cleaning of said guide roller assembly.

* * * * *